(12) United States Patent
Lebang (10) Patent No.: US 11,287,036 B2
(45) Date of Patent: Mar. 29, 2022

(54) COMPLEX RAMP IN VEHICLE SHIFT DRUM

(71) Applicant: Zhejiang CFMOTO Power Co., Ltd., Zhejiang (CN)

(72) Inventor: Xie Lebang, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 133 days.

(21) Appl. No.: 16/775,266

(22) Filed: Jan. 28, 2020

(65) Prior Publication Data

US 2020/0240517 A1 Jul. 30, 2020

(51) Int. Cl.
| | |
|---|---|
| *F16H 59/00* | (2006.01) |
| *F16H 61/00* | (2006.01) |
| *F16H 63/00* | (2006.01) |
| *F16H 63/20* | (2006.01) |
| *F16H 57/04* | (2010.01) |
| *F16H 63/30* | (2006.01) |
| *F16H 63/18* | (2006.01) |
| *F16H 63/32* | (2006.01) |
| *F16H 61/24* | (2006.01) |

(52) U.S. Cl.
CPC ....... *F16H 63/206* (2013.01); *F16H 57/0468* (2013.01); *F16H 63/18* (2013.01); *F16H 63/3013* (2013.01); *F16H 2061/245* (2013.01); *F16H 2063/322* (2013.01)

(58) Field of Classification Search
CPC ............. F16H 63/18; F16H 2063/3089; F16H 63/206; F16H 2063/322
See application file for complete search history.

(56) References Cited

U.S. PATENT DOCUMENTS

| | | | |
|---|---|---|---|
| 1,782,343 A * | 11/1930 | Dobbins | ............... B60W 10/10 74/334 |
| 4,726,258 A | 2/1988 | Hayashi et al. | |
| 4,879,919 A | 11/1989 | Sekizaki | |
| 5,181,893 A | 1/1993 | Ashikawa et al. | |
| 7,631,570 B2 | 12/2009 | Mizuno et al. | |
| 8,015,895 B2 | 9/2011 | Tomoda et al. | |
| 8,191,443 B2 | 6/2012 | Inui et al. | |
| 8,276,473 B2 | 10/2012 | Kobayashi et al. | |
| 8,387,477 B2 | 3/2013 | Ieda et al. | |
| 8,397,596 B2 | 3/2013 | Tomoda et al. | |
| 8,707,814 B2 | 4/2014 | Saitoh | |
| 9,027,430 B2 | 5/2015 | Mitsubori et al. | |
| 9,091,341 B2 | 7/2015 | Watanabe et al. | |

(Continued)

*Primary Examiner* — Jake Cook
(74) *Attorney, Agent, or Firm* — Shewchuk IP Services, LLC; Jeffrey D. Shewchuk (57) ABSTRACT

A shift drum has a recess which controls a fork to move one of two cooperating coaxially arranged gears for transmitting torque in a power train of a vehicle. The recess includes a straight section, which upon rotation of the shift drum does not move the fork either to the left or the right, and at least one ramp which does move the fork in one direction (i.e., to the left or the right). The ramp is more complex than a single line, such as having a first portion at a first right-shift portion ramp angle β and a second portion at a second right-shift portion ramp angle γ, perhaps with the intersection between the first right-shift portion ramp angle β and the second right-shift portion ramp angle γ being at the mid-line defined by the straight section of the recess.

20 Claims, 8 Drawing Sheets

(56) References Cited

U.S. PATENT DOCUMENTS

| | | | |
|---|---|---|---|
| 9,228,638 B2 | 1/2016 | Matsumoto | |
| 9,334,955 B2 | 5/2016 | Norita et al. | |
| 9,945,477 B2 | 4/2018 | Nakamura et al. | |
| 10,030,769 B2 | 7/2018 | Sugano et al. | |
| 10,323,694 B2 | 6/2019 | Bessho et al. | |
| 2009/0205455 A1* | 8/2009 | Kosugi | F16H 63/18 |
| | | | 74/473.21 |
| 2010/0294070 A1* | 11/2010 | Akashi | F16H 61/28 |
| | | | 74/473.36 |
| 2018/0216707 A1* | 8/2018 | Saitoh | F16H 3/10 |

\* cited by examiner

COMPLEX RAMP IN VEHICLE SHIFT DRUM

CROSS-REFERENCE TO RELATED U.S. APPLICATION(S)

None.

FIELD OF THE INVENTION

The invention relates to the technical field of all-terrain vehicles and motorcycles, and particularly to shift drums such as within a gearbox of such vehicles.

BACKGROUND OF THE INVENTION

Utility vehicles ("UVs"), all terrain vehicles ("ATVs") including side-by-sides, and motorcycles commonly utilize a one or two cylinder internal combustion engine that provides the torque necessary for locomotion over a wide variety of terrains, including over roads, unpaved trails, fields, rocks, etc. In such vehicles, the torque output by the engine commonly changes speed and/or direction between the engine output shaft and the half-shaft driving the ground engaging member(s) through a gearing arrangement, which can occur in a transmission, in a gear box, or in a differential of the power train. Within certain designs of such power train components, the torque transfer may involve one or more sets of two interacting gears which are coaxially mounted on the same shaft and moved axially with respect to each other between an engaged, torque transferring position and a disengaged position where the vehicle torque bypasses at least one of the two engageable gears. Similar power trains may exist in certain snowmobiles, personal watercraft or similar vehicles. A common example is within a gearbox (also called a gear case) which allows the vehicle to operate in forward (High gear), forward (Low gear), Neutral and Reverse using a shifting drum. For example, U.S. Pat. Nos. 4,726,258, 4,879,919, 5,181,893, 7,631,570, 8,015,895, 8,191,443, 8,276,473, 8,387,477, 8,397,596, 8,707,814, 9,027,430, 9,091,341, 9,228,638, 9,334,955 9,945,477 and 10,030,769, each incorporated by reference for such vehicle, power train and power train component teachings, are believed to all disclose structures in which the axial (longitudinal) position of at least one internally splined driving gear (also referred to as a "shifter" or "shifting sleeve") is controlled, by a shift fork which is in turn axially positioned by a shift drum (also called a "shift cam"), either to engage (and transfer torque) or not engage with a cooperating driven gear mounted coaxially relative to the driving gear/shifter. The driven gear typically then includes outer gear teeth which rotate and, when the driving gear/shifter and driven gear are engaged, drive the output gear and therethrough drive the drive shaft(s). Most commonly, the driving gear (shifter) includes teeth which, during engagement, mate into recesses of the driven gear. A reversal of parts is also possible, with the shifter providing the outer gear teeth and the driven gear having the internal splined connection to the shaft, but such reversals of parts are less common. Similarly, a reversal of shift motion is also possible, with the driven gear changing its axial position rather than the driving gear, but again such reversals are less common.

In many such structures, either the shift fork (most commonly) or the axially-moving gear is axially biased, such as by a spring, toward one axial direction. The spring-biased shifting allows the axial movement of the driving gear (shifter) to occur under a regulated force largely or entirely created by the spring and largely determined by selection of the desired spring constant.

To reduce the size of the gearbox or other power train component, some designs use an axially-moving driving gear which is fork-controlled not merely between two axial positions, but between three axially positions, such as from a) a middle (neutral, or non-engaged position) either to b) the left for engagement with one driven (perhaps high) gear, or to c) the right for engagement with a second (perhaps low) driven gear. In such cases, at least one of the movements of the axially-moving gear will be against the biasing spring force, which in general means that the axial movement force causing engagement of the driving gear (shifter) with one of the driven gears will not be as well controlled. For instance, the force pushing the driving gear (shifter) against and overcoming the spring force may depend on the speed and force used by the operator on the gear selector in the cab of the vehicle. In use, the driving gear (shifter) can bind against engagement in at least one direction and it can be difficult to smoothly shift the gear. Even when axially moving the driving gear (shifter) in the spring-induced direction, binding can still occur. Better solutions are needed.

BRIEF SUMMARY OF THE INVENTION

In view of this, the present invention provides a better type of shift drum for controlling an axial position of at least one of the driving and/or driven, coaxially arranged cooperating gears, which facilitates smoother and less binding movement between the non-engaged and the engaged axial positions, such that the gear can be more easily shifted by the shifting fork in at least one direction. A recess or channel on the shift drum is used to controlling the shifting fork. The recess includes a profile which includes a ramp having a complex, non-linear aspect, to provide a better force profile for shifting particularly when shifting against the spring force. In the preferred embodiment, the ramp portion moving the shift fork against the spring force is steeper when moving out of high gear than when moving into low gear.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
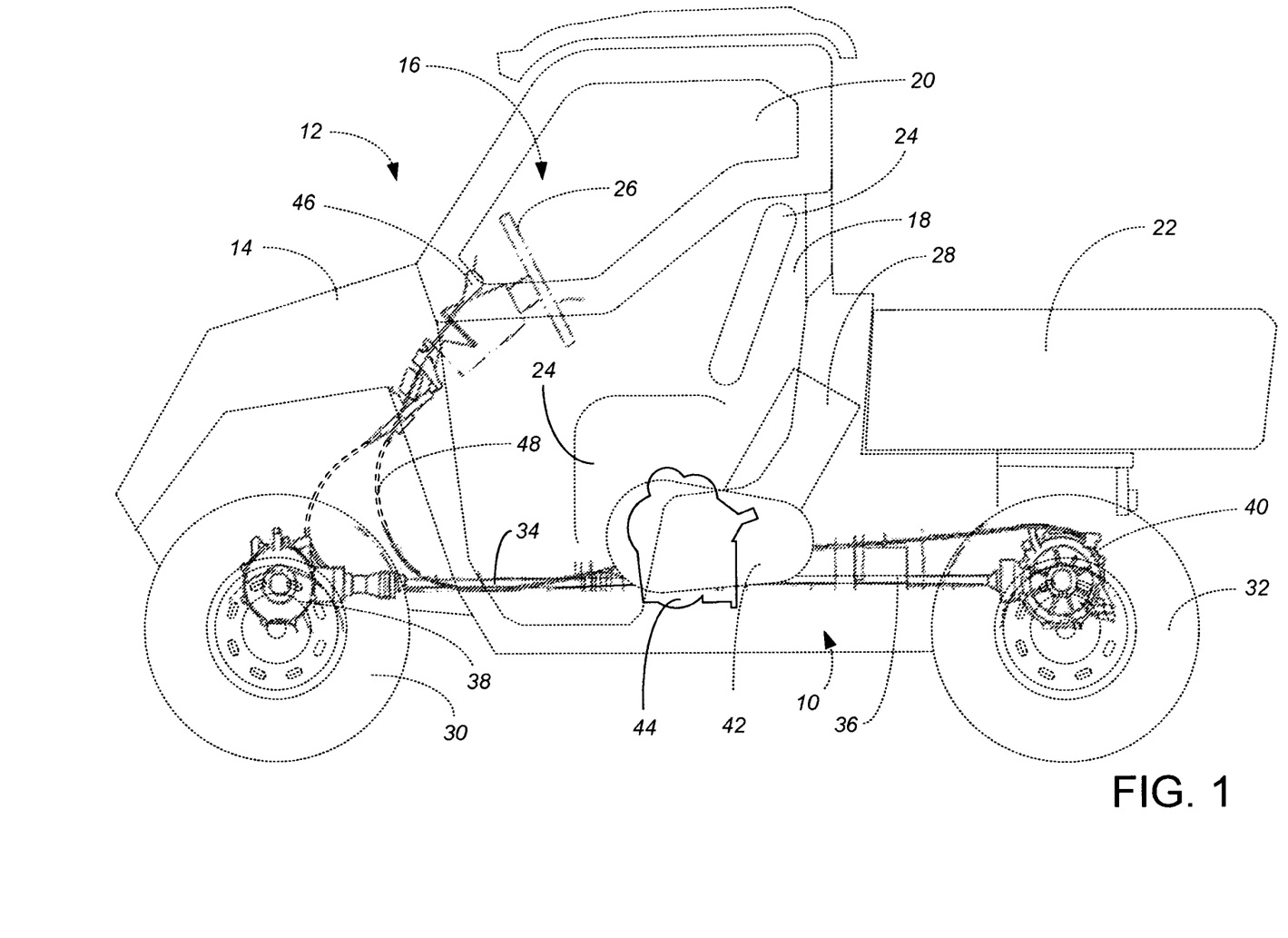
FIG. 1 is a schematic side view of an all-terrain vehicle using the present invention within its drive train.
Figure 2:
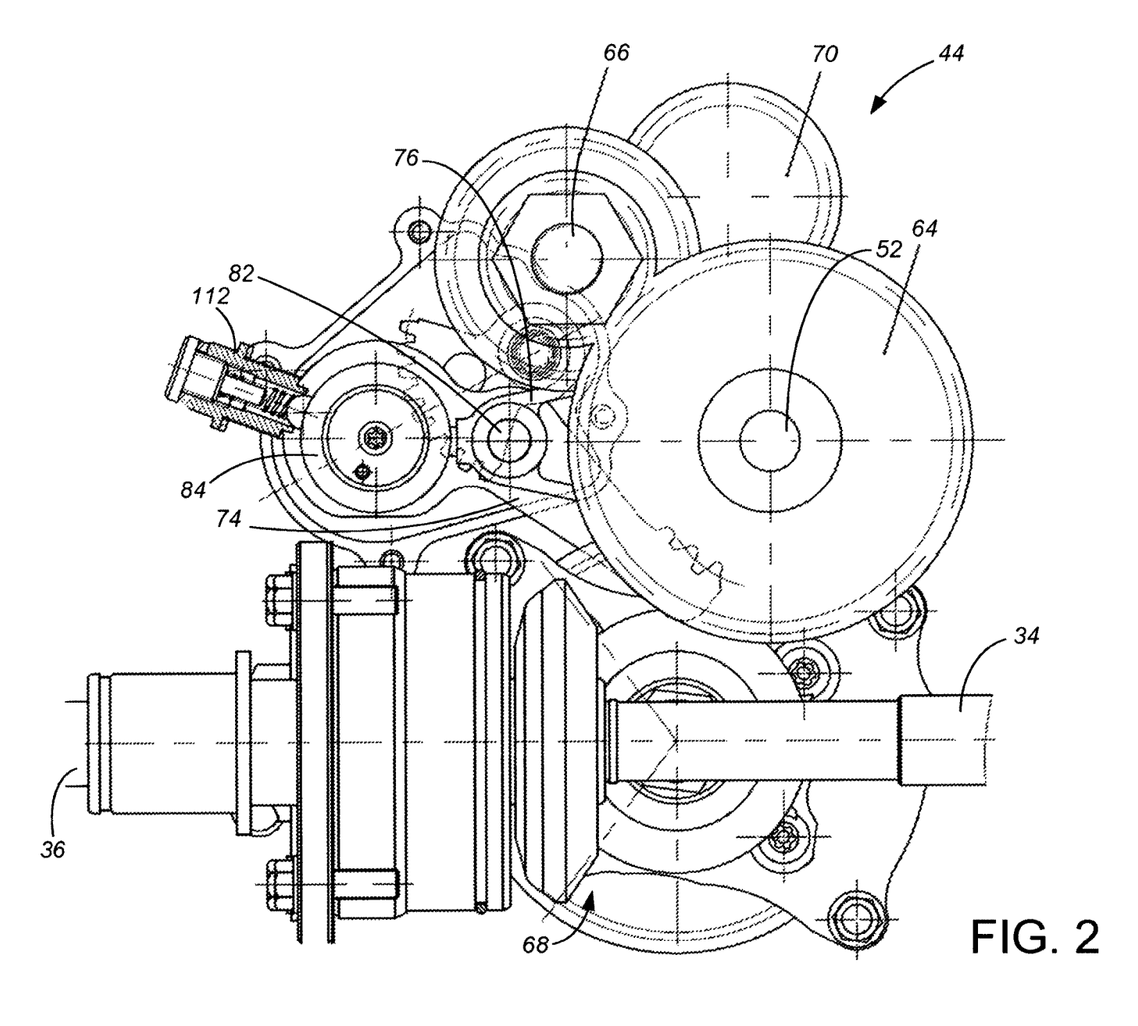
FIG. 2 is an end view of gearing using the present invention on one of the driving gears within a gearbox of the drive train of the vehicle of FIG. 1.
Figure 3:
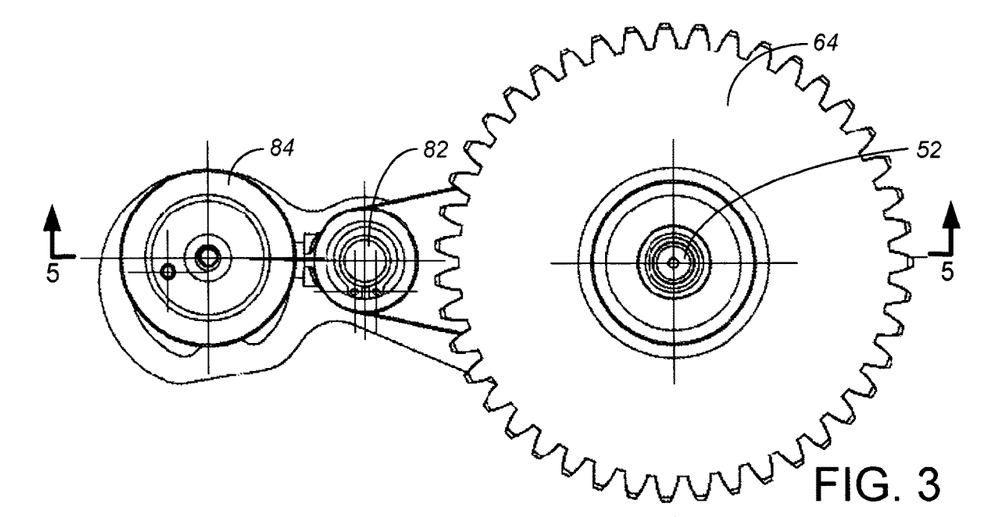
FIG. 3 is an end view, from the driven (low) gear side, of the gear shifting portion of the gearbox of FIGS. 1 and 2.

The present invention involves a better type of shift drum for controlling one of two driving or driven, coaxially arranged, interacting gears in the power train 10 of a vehicle such as the all-terrain vehicle 12 shown schematically in FIG. 1. The vehicle 12 is depicted with a front hood 14, a passenger compartment 16 with a door 18 and side window 20, and a rear cargo space 22. The driver (not shown) sits on a seat 24 and drives using a steering wheel 26. The vehicle 12 has a raid-mounted engine 28 which drives the front wheels and tires 30, the rear wheels and tires 32, or both the front and rear wheels, 30, 32 using a front drive shaft 34 and a rear drive shaft 36. The preferred power train 10 is driven by a one or two cylinder internal combustion engine 28 using a continuously variable transmission ("CVT") 42. While the invention could potentially be used elsewhere in the power train 10 such as in a front differential 38, a rear differential 40, or in a manual transmission (not shown) provided such component using a shift drum, in the preferred embodiment the invention is used in a gear box 44. The specific front-to-rear, up-to-down and left-to-right layout of the engine 28, CVT 42 and gear box 44 is insignificant as the gear box 44 can be reoriented, mirrored or flipped for any drive train layout as desired by the vehicle designer.

The preferred gear box 44 is operational based on a control within the cab of the vehicle 12, such as a gear selector 46 that allows selection by the operator between park ("P"), reverse ("R"), neutral ("N"), high ("H") and low ("L") gears. For instance, the gear selector 46 can be positioned on a dash (as shown) or console of the vehicle 12, connected to the gearbox 44 by a cable 48, lever or other linkage. One embodiment showing a portion of the internal mechanical structure within the gearbox 44 is shown in FIGS. 2-8.

At least one of the gears within the gear box 44 is keyed or otherwise secured for rotation with rotation of its shaft 52, which in this embodiment is powered from the crankshaft output of the engine 28, and will be referred to as the driving gear 50. In the preferred embodiment, the torque transfer from the shaft 52 to the driving gear 50 is achieved by having a splined inside diameter 54, which rides on a splined outer diameter 56 of a section of an input shaft 52, with the input shaft 52 being separately driven such as by a separate gear 58 or other driving mechanism (not shown). In the most preferred embodiment shown, the separate driving gear 58 is axially moving and is used for operating the vehicle 12 in reverse. In the most preferred embodiment, the torque output of the gear shifting portion can be either on a reverse driven gear 60, on a high driven gear 62 or on a low driven gear 64, depending upon the axial location of the driving gear 50 and the separate driving gear 58, delivered to gears on a transmission main shaft 66 (shown only in FIG. 2). The transmission main shaft 66 then provides torque to the input shaft of the CVT 42 (shown only in FIG. 1), which outputs torque through a bevel gear assembly 68 to the drive shafts 34, 36. When operating in reverse, torque is transmitted through a reverse idle gear 70 (shown only in FIG. 2) which changes the direction of rotation of the transmission main shaft 66. In alternative embodiments, the reversal of rotational direction for driving the vehicle 12 in reverse can be achieved such as by a chain connection (not shown) between the input shaft 52 and the transmission main shaft 66.

A park lock gear 72 can also be secured for rotation with the shaft 52. A park lock lever 74 is used, which can interact with the park lock gear 72 to restrict rotation of the shaft 52.

Figure 4:
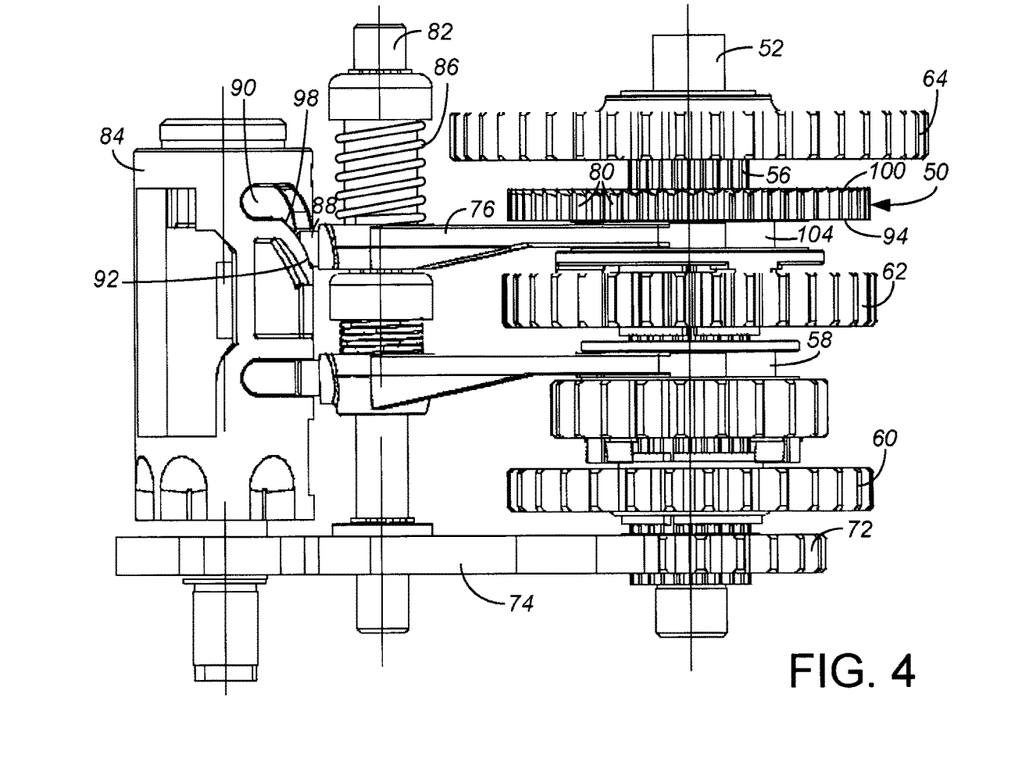
FIG. 4 is a bottom side view of the gear shifting portion of FIG. 3, taken while the gear shifting portion is in high gear.
Figure 5:
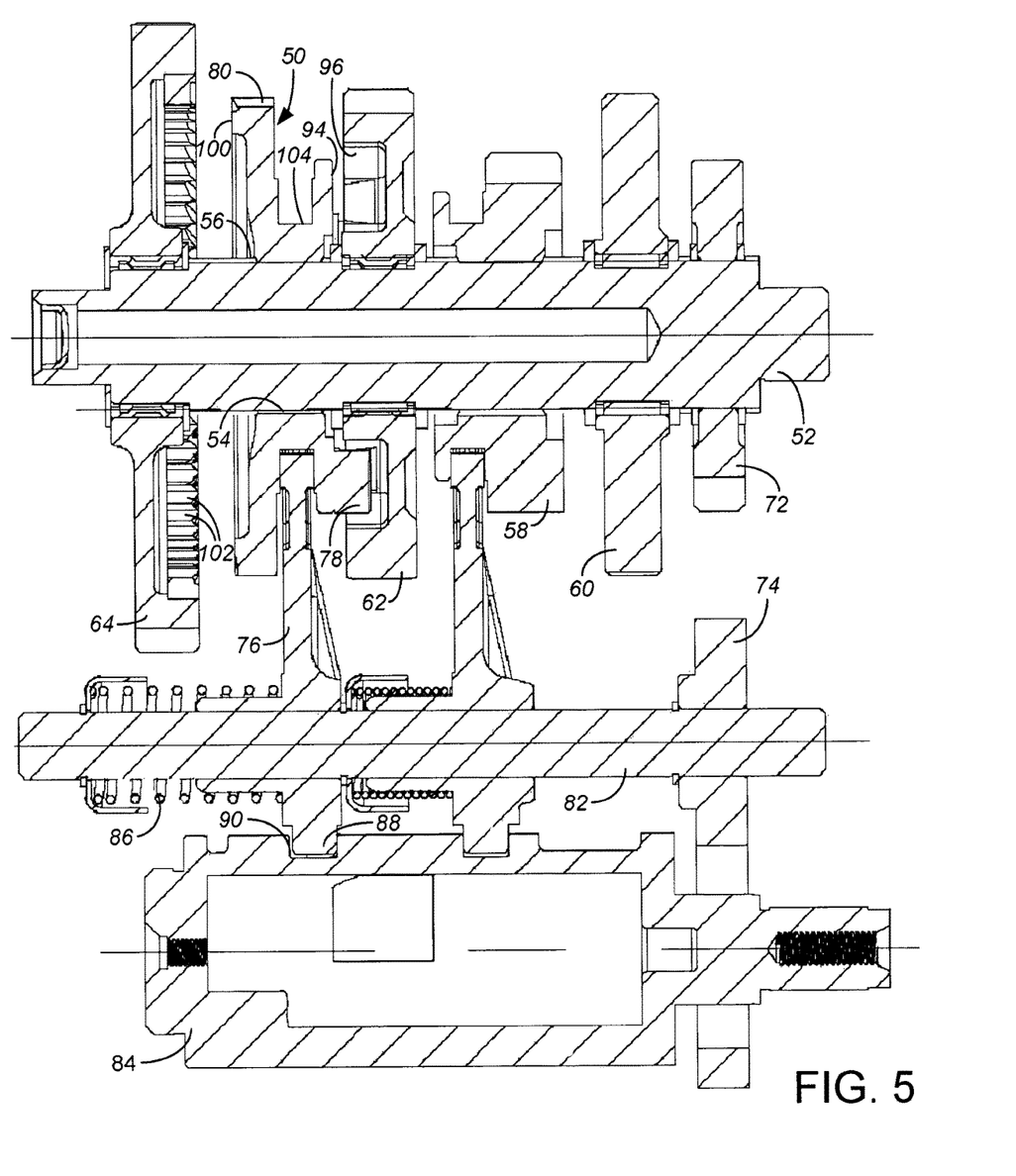
FIG. 5 is a cross-sectional view of the gear shifting portion of FIGS. 3 and 4, taken along line 5-5 in FIG. 3.
Figure 6:
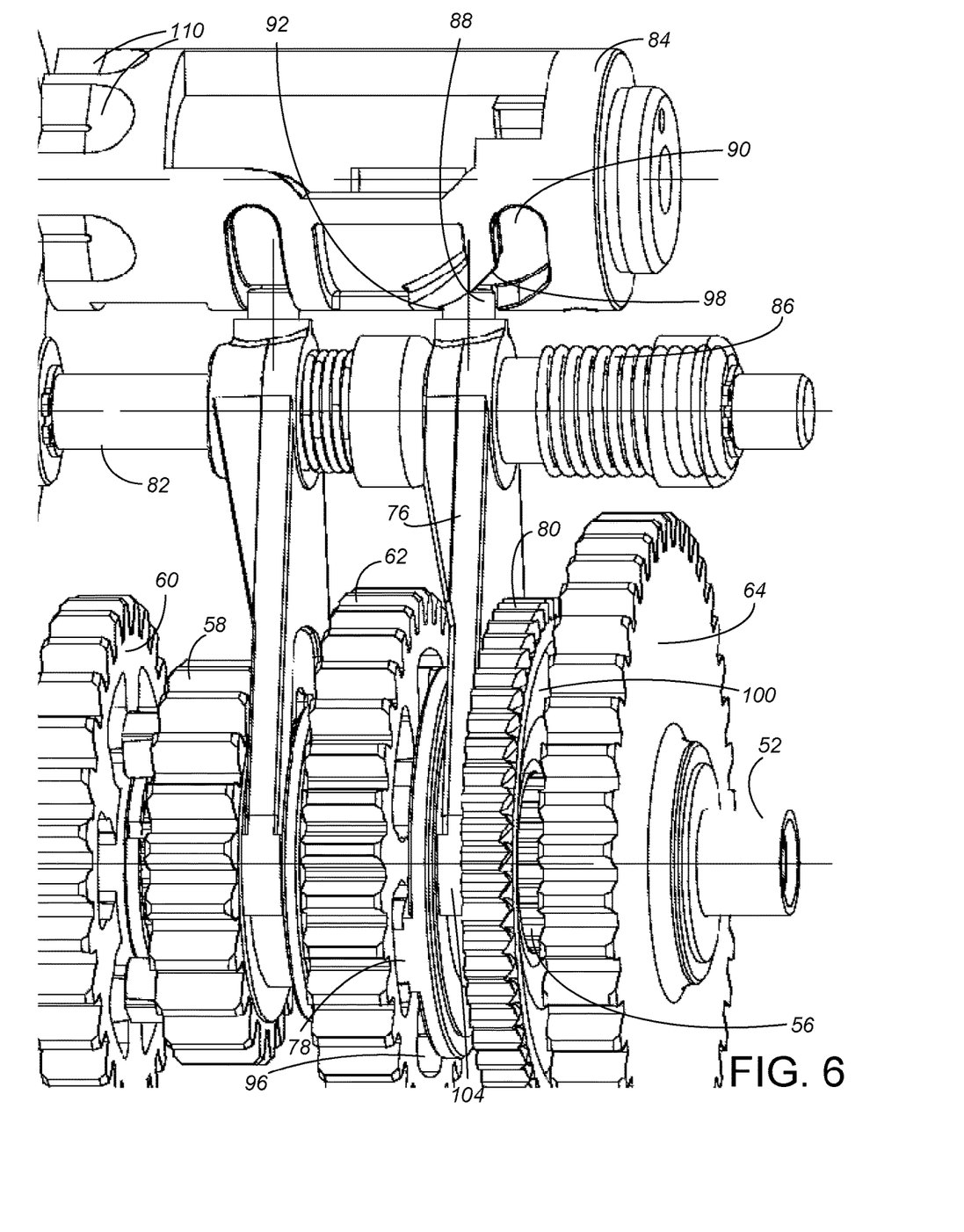
FIG. 6 is a perspective view of the gear shifting portion of FIGS. 3-5.
Figure 7:
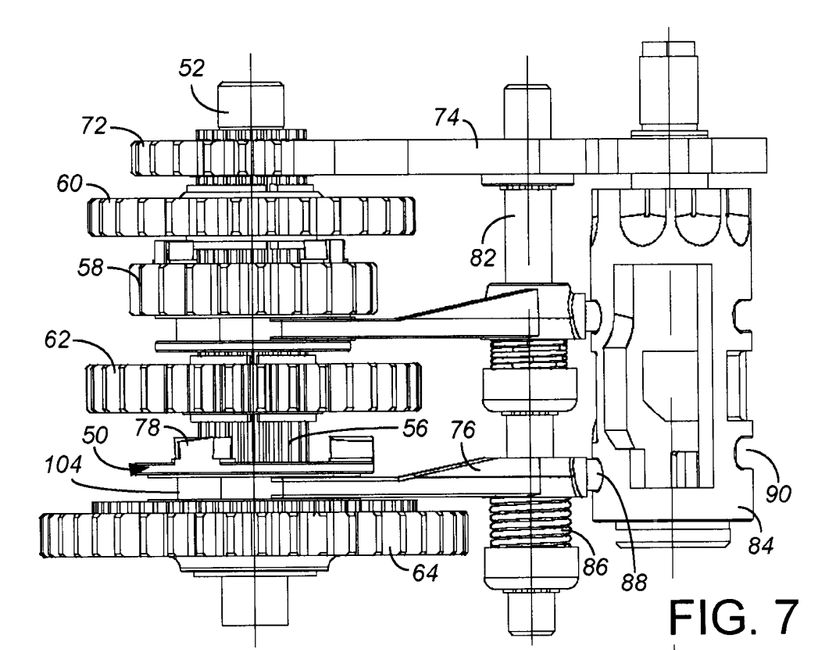
FIG. 7 is a side view similar to FIG. 4 of the gear shifting portion, but taken while the gear shifting portion is in low gear.
Figure 8:
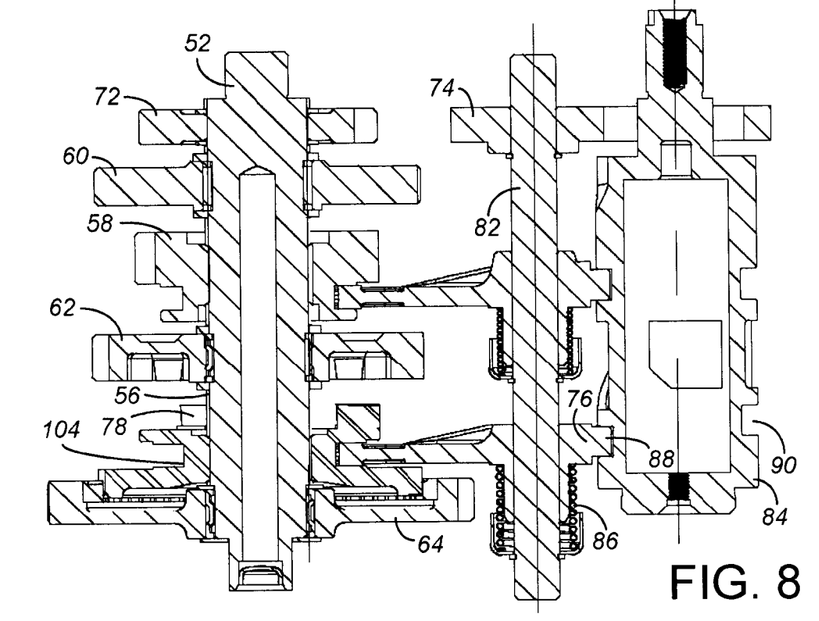
FIG. 8 is a cross-sectional view similar to FIG. 5 of the gear shifting portion, but taken while the gear shifting portion is in high gear.

In the most preferred embodiment shown, the invention is being employed only with the driving gear 50 and its two associated driven gears 62, 64. FIGS. 4-6 show the driving gear 50 in engagement with a high driven gear 62. The axial position of the driving gear 50 is controlled by movement of a fork 76. The fork 76 can push the driving gear 50 from a middle neutral or park condition in either direction. When the fork 76 pushes the driving gear 50 to the left to the position shown in FIGS. 4-6, teeth 78 (or potentially dogs, not shown) of the driving gear 50 engage with the high driven gear 62. The fork 76 can alternatively push the driving gear 50 in the opposite direction, i.e., to the right, such that other teeth 80 of the driving gear 50 engage with the low driven gear 64 as shown in FIGS. 7 and 8.

In the preferred arrangement, the fork 76 rides on a fork support shaft 82, with the axial position on the fork shaft 82 controlled by the circumferential position of a shifting drum 84. In this embodiment, the fork 76 of interest is biased to the left by a compression spring 86. The circumferential position of the shifting drum 84 is cable-controlled and/or linkage-controlled by the operator using the gear selector 46. A control arm 88 of the fork 76 rides within a recess 90 of the shift drum 84, pressed against the left side of the recess 90 by the spring 86. FIGS. 4-6 show a portion of the gearbox 44 while the operator has selected High gear. The circumferential position of the shift drum 84 is such that the control arm 88 is at a leftward section of the recess 90 i.e. when the operator used the gear selector 46 to rotate the shift drum 84 such that the control arm 88 was at the leftward section 92, the spring 86 pushed the fork 76 moving it to the left. The fork 76 has in turn pushed the driving gear 50 to the left, moving the driving gear 50 into engagement with the high driven gear 62. In this particular embodiment, the driving gear 50 includes three axially projecting teeth 78 on the face 94 toward the high driven gear 62. The high driven gear 62 freely rotates on a smooth section of the shaft 52. The high driven gear 62 includes six recesses or openings 96 (shown only in FIG. 6), which can mate with and receive the three teeth 78. With the three teeth/six recess configuration, when the operator is shifting from Neutral to High gear, the driving gear 50 will rotate (usually due to the torque from the shaft 52) at most 60° circumferentially relative to the high driven gear 62, until the teeth 78 align with the recesses 96 and the spring force pushes the driving gear 50 into engagement with the high driven gear 62.

If the operator further shifts from high into low, a ramp 98 of the recess 90 will cause the fork 76 to move back to the right against the force of the spring 86, compressing the spring 86. The ramp 98 moves the fork 76 past the neutral position, pushing the fork 76 and the driving gear 50 further to the right, until teeth 80 on the right side 100 of the driving gear 50 come into engagement with the low driven gear 64. The shapes of the teeth 80 on the driving gear 64 and of the cooperating teeth 102 are further described in co-pending application no. XX/XXX,XXX, filed on even date herewith and incorporated by reference. Preferably there are between twenty and one hundred teeth 80 on the driving gear 50 which engage with between twenty and one hundred teeth 102 on the driven low gear 64. In contrast to other gear shift changes, which may be constrained to only be allowed either while the vehicle 12 is stationary and/or while the operator is braking, shifting from High to Low gear is commonly allowed while the vehicle 12 is travelling (at least at low speed), and possibly while the operator is providing torque/accelerating the vehicle 12 (such as while depressing the gas pedal or turning the throttle).

The driving gear 50 includes a middle section providing an outer diameter recess 104 or channel which receives the shifting fork 76, and the shifting fork 76 is used to push the driving gear 50 in either axial direction. The driving gear 50 can smoothly slide on the splines 56 of the input shaft 52 from a middle, disengaged position, to either a first, High gear position where the driving gear 50 has been slid about 5.5 mm in one axial direction on the input shaft 52, or to a second, Low gear position wherein the driving gear 50 has been slid about 5.5 mm in the other axial direction on the input shaft 52 into engagement with the low driven gear 64. Based on the sliding of the driving gear 50 in an axial direction on the shaft 52, one of the faces 100 of the driving gear 50, on one side of the shifting fork 76, can be optionally engaged with the "low" coaxially arranged output gear 64, while the opposing face of the driving gear 50, on the other side of the shifting fork 76, can be optionally engaged with a "high" coaxially arranged output gear 62.

Figure 9:
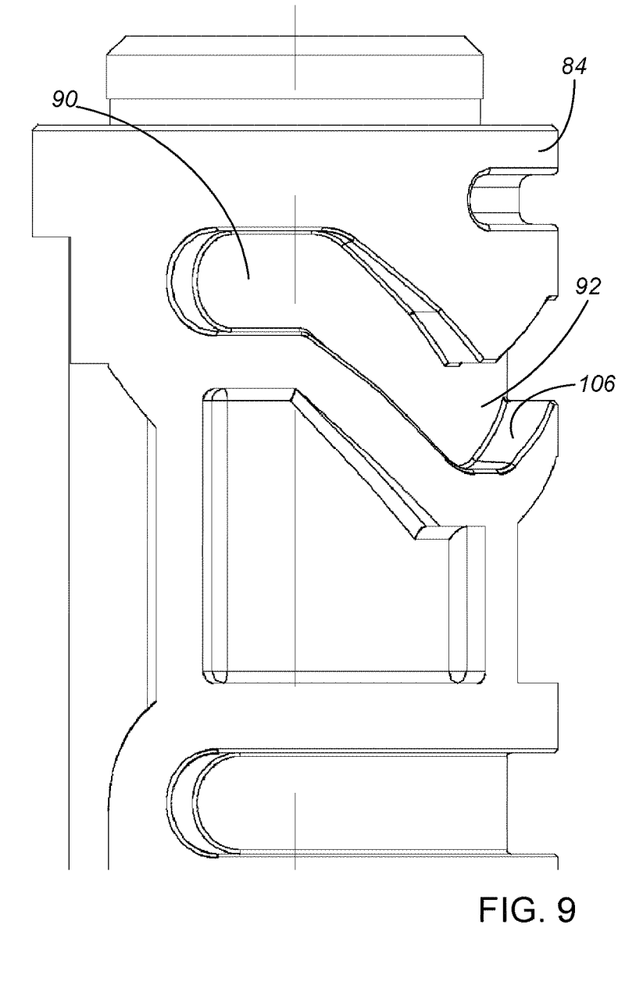
FIG. 9 is a side view of a portion of the shift drum of FIGS. 2-8.
Figure 10:
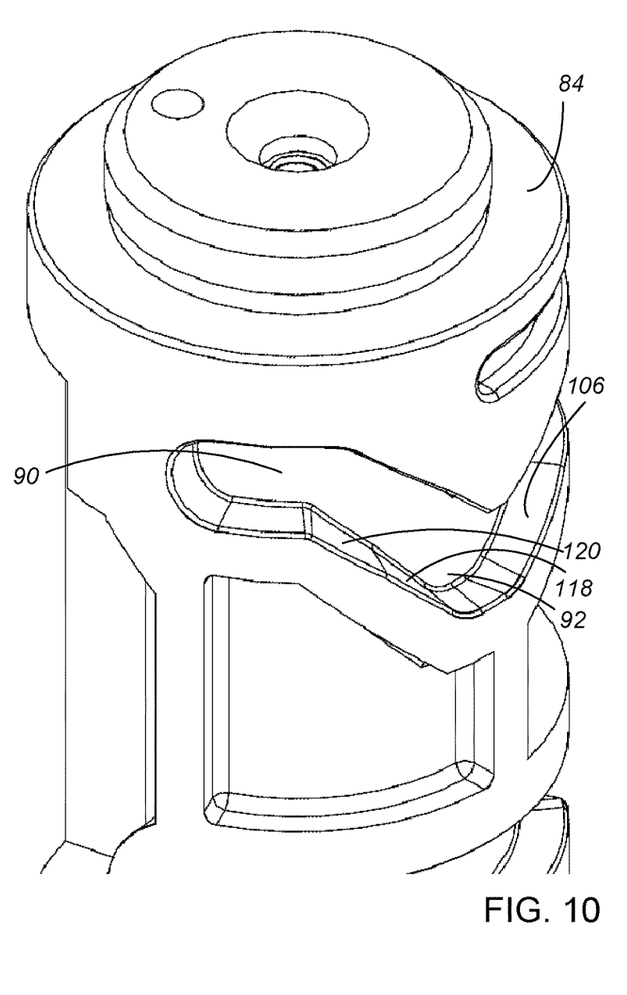
FIG. 10 is a perspective view of a portion of the shift drum of FIGS. 2-9.
Figure 11:
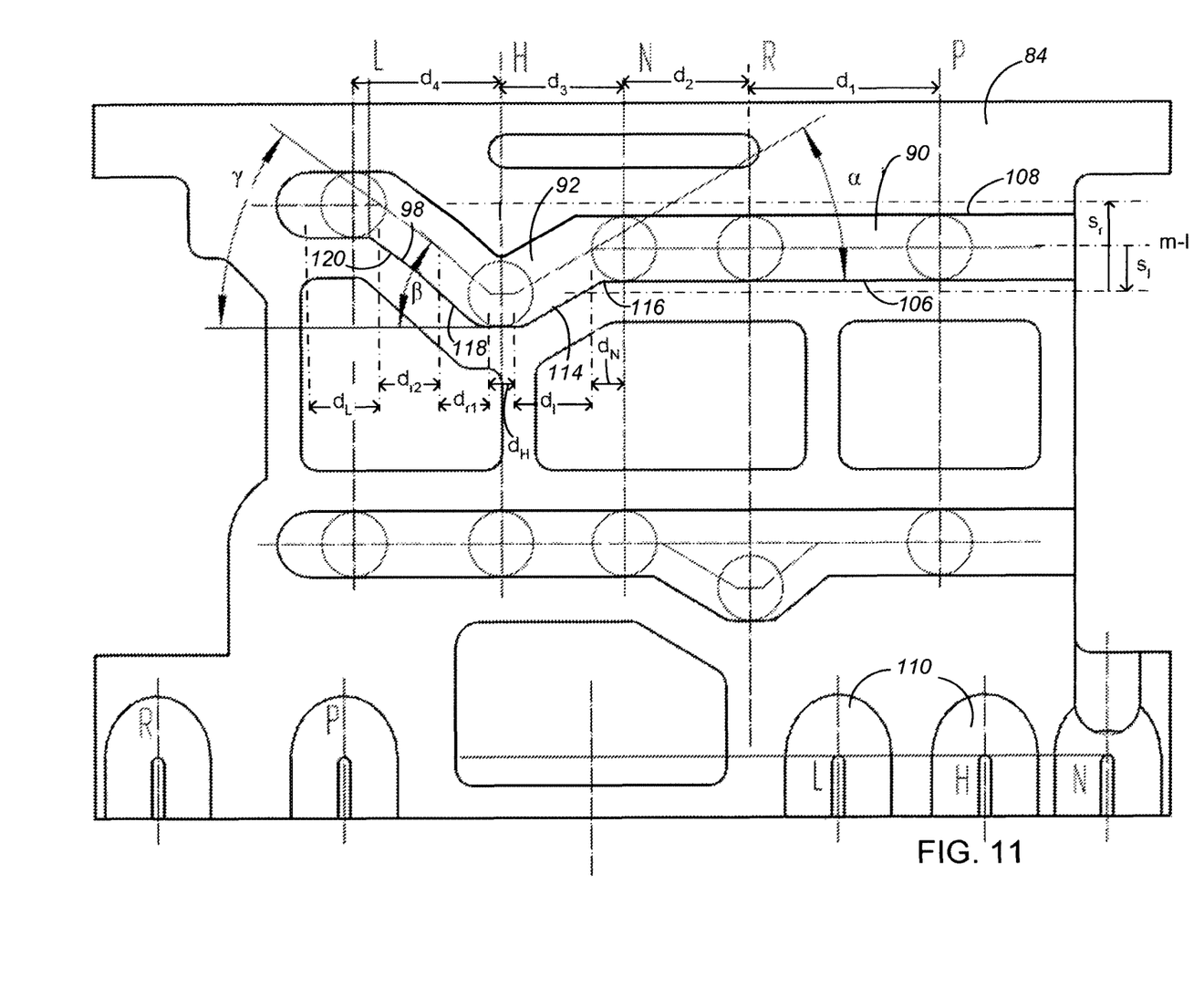
FIG. 11 is a layout of the recesses of the shift drum of FIGS. 2-10.

The shape of the recess 90 in the shift drum 84 is shown in more detail in FIGS. 9-11. FIG. 11 includes a series of circles which represent the relative positions of the control arm 88 of the fork 76 for each of the gear selections of Park, Reverse, Neutral, High and Low gear. Generally, with the compression spring 86 biasing the fork 76 to the left, only the shape of the left edge 106 of the recess 90 matters. The preferred embodiment nonetheless keeps the right edge 108 of the recess 90 generally aligned with the left edge 106 of the recess 90.

At a different longitudinal position of the preferred shift drum 84, depressions 110 can be defined, receiving a ball of a spring plunger 112 (shown only in FIG. 2), for each of the Park, Reverse, Neutral, High and Low positions. The ball of the spring plunger 112 can only be removed from the depressions 110 by pressing a separate button (such as a thumb button, not shown) on the gear selector 46, thereby preventing inadvertent shifting.

As can be seen in FIG. 11, the Park, Reverse and Neutral positions each keep the fork 76 at the mid-line m-l, so driving gear 50 does not engage either the high driven gear 62 or the low driven gear 64. In the preferred embodiment, the circumferential distance $d_1$ from Park to Reverse is somewhat greater than the circumferential distance $d_2$ from Reverse to Neutral. For instance, the preferred embodiment uses a 63° rotation $d_1$ of the shift drum 84 from Park to Reverse but only a 42° rotation $d_2$ of the shift drum 84 from Reverse to Neutral.

When the operator using the gear selector 46 further shifts the vehicle 12 into High gear, a leftward section 92 of the recess 90 allows the fork 76 to move to the left by a left shift distance $s_1$ from the mid-line m-l, biased to the left with the spring force from the compression spring 86 so the control arm 88 of the fork 76 slides down a left shift ramp 114. Moving out of the Neutral position, the left edge 106 of the recess 90 first includes a short straight portion 116 having a circumferential distance $d_N$. This straight portion $d_N$ allows the ball of the spring plunger 112 within the depression 110 to help center on Neutral gear, before the operator tactilely feels the assistance of the compression spring 86 in shifting into High gear. In the preferred embodiment, this circumferential distance $d_N$ of the short straight portion 116 after Neutral is about 10°.

The left edge 106 of the recess 90 then moves linearly and smoothly to the left at a first ramp angle α relative to straight, over a left-shift ramp rotation $d_1$. The preferred embodiment uses about a 26° left-shift rotation $d_1$ of the shift drum 84, with the left edge 106 moving to the left at a 30° first ramp angle α over a leftward shift distance $s_1$ of 5.5 mm.

At the High gear position, the preferred embodiment includes a straight portion $d_H$ of about 8°, i.e., about 4° of shift drum rotation on either side of the High position. This straight portion $d_H$ allows the ball of the spring plunger 112 within the depression 110 to help center on High gear. This straight portion $d_H$ allows the operator to tactilely feel the resistance of the compression spring 86 when shifting out of High gear. With the three segments $d_N + d_1 + d_H/2$, the circumferential distance $d_3$ from Neutral to High is about the same as the circumferential distance $d_2$ from Reverse to Neutral, e.g., the circumferential distance $d_3$ from Neutral to High is preferably about 41°.

When the operator shifts the vehicle 12 from High gear into Low gear, the fork 76 must move the driving gear 50 from the left position in engagement with the high driven gear 62 back through the neutral middle position and to the right position in engagement with the low driven gear 64. That is, the shift-right movement $s_r$ is about twice the shift-left movement $s_1$, with this entire shift-right movement $s_r$ of the driving gear 50 being against the spring force from the compression spring 86. In the preferred embodiment, the shift-right movement $s_r$ is about 11 mm, in comparison to a shift-left movement $s_1$ of about 5.5 mm. The circumferential distance $d_4$ from High to Low is preferably greater than the distance from Reverse to Neutral $d_2$ and greater than the distance $d_3$ from Neutral to High. For instance, the preferred embodiment has a distance $d_4$ from High to Low which is about 49°.

During this distance $d_4$, the left edge 106 of the recess 90 proceeds on a ramp 98 which is not a single, linear advancement but instead proceeds on a complex profile. In the preferred embodiment shown, the ramp 98 is provided in two ramp portions 118, 120, a first ramp portion 118 for while the driving gear 50 is moving out of engagement with the high driven gear 62 and a second, less steep ramp portion 120 for while the driving gear 50 is moving into engagement with the low driven gear 64. In the preferred embodiment, the first ramp portion 118 occurs over about a first ramp distance $d_{r1}$ of 16° of shift drum rotation, at a first ramp portion angle β of about 42°. The second ramp portion 120 occurs over a second ramp distance $d_{r2}$ of about 20° of shift drum rotation, at a second ramp portion angle γ of about 36°. By having the second ramp portion angle γ be less than the first ramp portion angle β, for a consistent speed of shift drum rotation, the second ramp portion 120 moves the driving gear 50 slower than the first ramp portion 118 but provides a greater mechanical advantage than the first ramp portion 118. If the operator provides a consistent force on the gear selector 46 for the entire throw from High gear to Low gear, the sideways (to the right) force provided by the first ramp portion 118 will be lower than the sideways force provided by the second ramp portion 120. The greater sideways force provided by the second ramp portion 120 more easily overcomes any binding of the driving and low driven gears 50, 64 during engagement between their teeth 80, 102. The relatively slower speed of moving the driving gear 50 during the second ramp portion also makes it less likely for binding to occur and makes it less perceptible to the operator that binding could be occurring, giving a smoother tactile sensation of shifting into Low gear.

After the driving gear 50 is fully engaged with the low driven gear 64, the recess 90 has a straight low gear portion $d_L$. This straight portion $d_L$ allows the ball of the spring plunger 112 within the depression 110 to help center on Low gear, before the operator tactilely feels the assistance of the compression spring 86 in shifting back out of Low gear into High gear. In the preferred embodiment, the straight low gear portion $d_L$, is about 24° of shift drum rotation, including about 10° of shift drum rotation before the Low position and about 14° of shift drum rotation after the Low position.

While the preferred embodiment merely uses two different right-shift ramp portions 118, 120 which are both linear, other embodiments use an even more complex ramp shape from High gear to Low gear. On one hand, having a sharp difference between each of the straight portions $d_H$, $d_L$ and the ramp 98 provides the operator with a tactile feel for shifting out of High or Low gear. But during the right-shift ramp 98, the slope can change in more than two straight portions 118, 120. For instance, a middle shallowest portion (not shown) of the ramp 98 could be provided for an about 1 mm rightward portion of the throw $s_r$, just past the mid-line m-l, when the driving gear 50 first engages the teeth 102 of the low driven gear 64. Additionally, instead of using only linear ramps portions 118, 120, the ramp portions could be curved at their intersection points (shaped like an S-curve, not shown) to more smoothly change from one ramp portion to the next. By providing a complex shape to the ramp 98, the present invention allows more careful control over the forces involved in shifting particularly against the force of spring 86, providing a smoother and more reliable driving experience.

Although the present invention has been described with reference to preferred embodiments, workers skilled in the art will recognize that changes may be made in form and detail without departing from the spirit and scope of the invention.

The invention claimed is:

1. A shift drum for a fork to move one of two cooperating coaxially arranged gears for transmitting torque in a power train of a vehicle, the shift drum having a recess for receiving a control arm of the fork, wherein the recess comprises:
   a straight section, which upon rotation of the shift drum does not move the fork either to the left or the right;
   a first ramp, angled relative to the straight section, which upon rotation of the shift drum moves the fork in one direction; and
   a second ramp, angled relative to the straight section oppositely to the first ramp, which upon rotation of the shift drum moves the fork in the other direction, wherein the second ramp includes a first portion with a first portion ramp angle measured relative to the straight section and a second portion with a second portion ramp angle measured relative to the straight section, with the second portion ramp angle being shallower than the first portion ramp angle.

2. The shift drum of claim 1, wherein the first ramp is linear with a first ramp angle measured relative to the straight section, and wherein the first portion is linear and the second portion is linear.

3. The shift drum of claim 2, wherein the first portion ramp angle and the second portion ramp angle are both steeper than the first ramp angle.

4. The shift drum of claim 3, wherein the first ramp angle is about 30°, wherein the first portion ramp angle is about 42°, and wherein the second portion ramp angle is about 36.5°.

5. The shift drum of claim 4, wherein the first ramp angle occurs over a about 26° of shift drum rotation, wherein the first portion ramp angle occurs over about 16° of shift drum rotation, and wherein the second portion ramp angle occurs over about 20° of shift drum rotation.

6. The shift drum of claim 2, wherein an intersection between the first portion and the second portion of the second ramp occurs at a mid-line of the straight section.

7. The shift drum of claim 1, provided in a gearbox, with the gear box further having:
   a fork having a control arm received and sliding within the recess of the shift drum;
   a shaft carrying power train torque;
   a driving gear, axially moveable on the shaft, with its axial movement on the shaft controlled by the fork;
   a driven high gear rotationally mounted on the shaft on one side of the driving gear; and
   a driven low gear rotationally mounted on the shaft on an opposing side of the driving gear.

8. A gearbox for transferring power train torque of a vehicle, the gearbox being controllable by a gear selector, the gearbox comprising:
   a shift drum having a recess;
   a fork having a control arm received and sliding within the recess of the shift drum;
   a shaft carrying power train torque;
   a driving gear, axially moveable on the shaft, with its axial movement on the shaft controlled by the fork, the driving gear being rotationally secured to the shaft to transmit power train torque to or from the shaft;
   a driven high gear rotationally mounted on the shaft on one side of the driving gear; and
   a driven low gear rotationally mounted on the shaft on an opposing side of the driving gear;
   wherein the recess comprises:
      a straight section, which upon rotation of the shift drum does not move the fork either to the left or the right, the straight section establishing a mid-line in which the driving gear is not in engagement either with the driven high gear or the driven low gear;
      a first ramp, angled relative to the straight section, which upon rotation of the shift drum moves the fork in one direction, with the fork moving the driving gear into engagement with the driven high gear; and
      a second ramp, angled relative to the straight section oppositely to the first ramp, which upon rotation of the shift drum moves the fork in the other direction, with the fork moving the driving gear into engagement with the driven low gear, wherein the second ramp includes a first portion with a first portion ramp angle measured relative to the straight section and a second portion with a second portion ramp angle measured relative to the straight section, with the second portion ramp angle being different than the first portion ramp angle.

9. The gearbox of claim 8, further comprising a spring biasing the driving gear toward the driven high gear, such that the first ramp allows the fork to move under the spring force of the spring, and the second ramp pushes the fork against the spring force of the spring.

10. The gearbox of claim 9, wherein the first ramp is linear with a first ramp angle measured relative to the straight section, and wherein the first portion is linear and the second portion is linear, with the second portion ramp angle being shallower than the first portion ramp angle.

11. The gearbox of claim 10, wherein the first portion ramp angle and the second portion ramp angle are both steeper than the first ramp angle.

12. The gearbox of claim 11, wherein the first ramp angle is about 30°, wherein the first portion ramp angle is about 42°, and wherein the second portion ramp angle is about 36.5°.

13. The gearbox of claim 12, wherein the first ramp angle occurs over a about 26° of shift drum rotation, wherein the first portion ramp angle occurs over about 16° of shift drum rotation, and wherein the second portion ramp angle occurs over about 20° of shift drum rotation.

14. The gearbox of claim 10, wherein an intersection between the first portion and the second portion of the second ramp occurs at the mid-line of the straight section.

15. The gearbox of claim 9, wherein the driving gear comprises:
an inside diameter with a plurality of axially extending splines for transferring power train torque to or from the shaft; and
a fork-receiving recess on its outer periphery.

16. The gearbox of claim 15, wherein the driving gear is formed of steel with its inside diameter in the range of 20-40 mm, and wherein the axially extending splines each have a height which is less than 20% of the inside diameter.

17. The gearbox of claim 15, wherein the driving gear further comprises a plurality of axially extending teeth for engaging with the driven high gear.

18. The gearbox of claim 17, wherein the driving gear has a plurality of axially extending teeth for engaging with the driven low gear, and wherein the teeth for engaging with the driven high gear are closer to the rotational axis than the teeth for engaging with the driven low gear.

19. The gearbox of claim 9, wherein the driving gear has a plurality of teeth for engagement with the driven low gear, which teeth extend axially and face outward on an outer periphery of the driving gear, wherein teeth on the driven low gear extend axially and face inwardly, such that when engaged the teeth on the driven low gear extend around the teeth of the driving gear.

20. The gearbox of claim 19, wherein the outer periphery of the driving gear has a diameter of over 40 mm, wherein there are between twenty and one hundred teeth on the driving gear which engage with between twenty and one hundred teeth on the driven low gear.

* * * * *